K. CHAMBERS.
TIRE.
APPLICATION FILED OCT. 7, 1910.

1,031,523.

Patented July 2, 1912.

Witnesses

Inventor
K. Chambers
By _____, Attorneys

UNITED STATES PATENT OFFICE.

KELLEY CHAMBERS, OF ELKMONT SPRINGS, TENNESSEE.

TIRE.

1,031,523.

Specification of Letters Patent.

Patented July 2, 1912.

Application filed October 7, 1910. Serial No. 585,843.

*To all whom it may concern:*

Be it known that I, KELLEY CHAMBERS, citizen of the United States, residing at Elkmont Springs, in the county of Giles and State of Tennessee, have invented certain new and useful Improvements in Tires, of which the following is a specification.

This invention relates to improvements in tires for automobiles and like vehicles, and has for one of its objects to provide a device of this character in which provision is made for guarding the inflatable inner tube and to produce an armored tire of improved construction and increased efficiency.

Another object of the invention is to provide a device of this character constructed of a plurality of independent units which may be manufactured separately and detachably connected.

Figure 1:
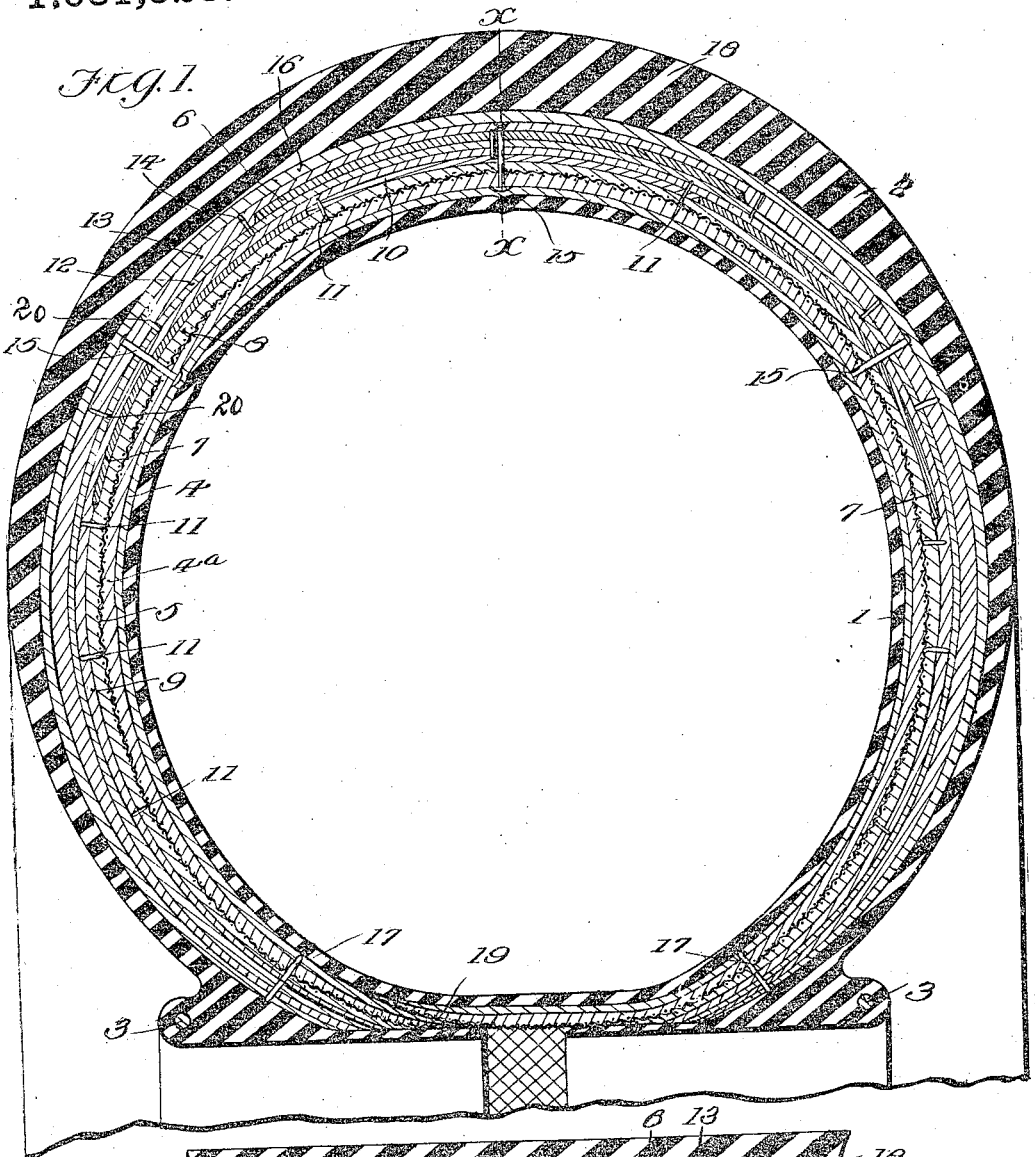
Figure 2:
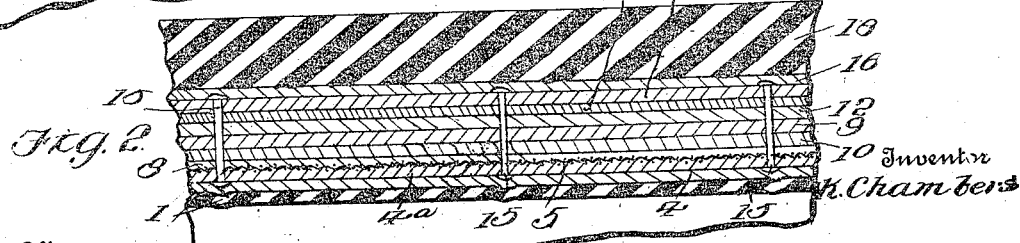

With these and other objects in view the invention consists in certain novel features of construction as hereinafter shown and described and then specifically pointed out in the claim, and in the drawings illustrative of the preferred embodiment of the invention, Figure 1 is a transverse section, enlarged, of a tire constructed in accordance with the invention; Fig. 2 is a sectional detail on the line X—X of Fig. 1.

Corresponding and like parts are referred to in the following description and indicated in all the views of the accompanying drawings by the same reference characters.

The improved tire comprises in general a plurality of casing members which are capable of being independently manufactured and independently applied and constitutes a laminated tire when united.

The improved casing includes an inner casing section formed of a layer of fabric 4ª overlapping at its confronting edges, as shown at 19, within which the inflatable inner tube 1 is supported, the overlapping of the plies providing for the separation thereof to enable the inner tube to be inserted. Surrounding the ply member 4 is a sheathing of woven wire, represented as a whole at 5, the woven wire material being inserted at one edge between the overlapped portions of the member 4, while the other edge of the woven wire sheathing extends over the overlapped portions. By this means the woven wire sheathing is supported and retained in position, as hereafter more fully explained. Surrounding the woven wire sheathing 5 is another or intermediate casing portion of a plurality of layers, any required number being employed, but generally two will be used, as shown. The inner intermediate casing portion is formed of two fabric plies 8—9. Located between the plies 8—9 of the intermediate casing portion are metal bands or strips 7 spaced apart and with a filler strip of fabric 10 between the confronting ends of the bands, the filler strip thus preventing the displacement of the bands.

The outer casing portion is formed of a plurality of layers of fabric preferably two, as shown at 12—13. Interposed between the plies or layers 12—13 of the outer casing portion is another metal band 6, the latter being located opposite the space between the bands 7 and extending beyond the confronting edges of the same. By this means the bands are arranged in "staggered" relation when the casing portions are positioned, as shown in Fig. 1. Surrounding the outer intermediate casing member is another casing member 16 of suitable fabric. The plies of the inner intermediate casing member are united at suitable intervals by stitches 11, while the plies of the outer intermediate casing member are similarly united by stitches 20. The intermediate casing members and the outer casing member do not extend entirely around the inner casing member and the woven wire sheathing, but a space is left between them, as shown in Fig. 1.

The members 7—8 of the intermediate casing section are united at intervals by rivets 11, while the members 12—13 of the outer casing portion are similarly and independently united by rivets 20. The three casing portions are further secured by longer rivets 15. The edges of the various casing portions are reduced as shown. Located within the inner casing portion is a fabric shield or guard 4, while a similar fabric shield or guard 16 bears over the outer layer 13 of the outer casing portion. The inner shield or guard 4 protects the fragile inner tube 1 from the inner heads of the rivets 15, while the outer shield or guard protects the outer tube 18 from the outer shields of the rivets 15 and 20. By this means no danger exists of injury to the relatively fragile material of the inner and outer tubes from contact with the heads of the rivets. The rivets 15 extend outwardly through the fabric layer 4ª, the woven wire sheathing 5, the fabric layers 8—9, the guard plates 7, and the fabric layers 12—13, and thus bind these members together. Other rivets 17 are inserted through the casing members near their confronting ends, as shown, to bind the parts together.

By this arrangement it will be obvious that the improved tire is formed of a plurality of independent units which may be separately manufactured and applied by simply inserting the outer members over the rivets 15—17. It will also be obvious that the parts may be readily separated by simply cutting off the outer heads of the various rivets. Thus in event of the impairment or fracture of one or more of the units it can be readily replaced without discarding the remaining units. This is an important advantage and materially increases the utility and efficiency of the improved tire.

The casing members heretofore described are surrounded by the tread or shoe member 18 of the usual form and provided with the flanges or "hooks" 3 by which the tire is secured in position.

It will thus be obvious that an efficient tire guard or shield is produced whereby the inflated inner tube 1 is effectually protected from puncture, while at the same time the units which compose the protecting structure are separately and independently constructed, so that they may be readily assembled, and, as before stated, in event of the fracture or impairment of one or more of the units the impaired member may be readily replaced without discarding the remaining portions.

Having thus described the invention, what is claimed is:

A tire comprising an outer casing portion formed of a plurality of layers of fabric, a sheet metal guard strip between the layers of said outer casing portion, an inner portion formed of a layer of fabric and a layer of woven wire, an intermediate portion formed of a plurality of layers of fabric, a plurality of sheet metal guard strips between the layers of said intermediate casing portion and the spaced apart and underlapping the guard strip of the outer casing portion, fastening devices extending through the layers of said outer casing portion, fastening devices extending through the layers of said intermediate casing portion, fastening devices extending through the outer inner and intermediate casing portions, an outer protecting sheathing extending over the outer casing portion and the outer terminals of the fastening devices, and an inner protecting sheathing extending within the inner casing portion and over the inner terminals of the fastening devices.

In testimony whereof, I affix my signature in presence of two witnesses.

KELLEY CHAMBERS. [L. S.]

Witnesses:
TULLY BROWN,
FRANK HARLOW.